(12) United States Patent
Eisenberg

(10) Patent No.: US 12,378,042 B2
(45) Date of Patent: Aug. 5, 2025

(54) STORAGE SYSTEM WITH MAGNETIC SEALING CLOSURE

(71) Applicant: Sam J. Eisenberg, Furlong, PA (US)

(72) Inventor: Sam J. Eisenberg, Furlong, PA (US)

( * ) Notice: Subject to any disclaimer, the term of this patent is extended or adjusted under 35 U.S.C. 154(b) by 80 days.

(21) Appl. No.: 17/896,197

(22) Filed: Aug. 26, 2022

(65) Prior Publication Data

US 2023/0067228 A1    Mar. 2, 2023

Related U.S. Application Data

(60) Provisional application No. 63/237,373, filed on Aug. 26, 2021.

(51) Int. Cl.
*B65D 43/02* (2006.01)
*B65D 45/32* (2006.01)

(52) U.S. Cl.
CPC ......... *B65D 43/0233* (2013.01); *B65D 45/32* (2013.01); *B65D 2313/04* (2013.01)

(58) Field of Classification Search
CPC ............ B65D 11/1853; B65D 2313/04; A45C 13/1069; Y10S 206/818
See application file for complete search history.

(56) References Cited

U.S. PATENT DOCUMENTS

| | | | |
|---|---|---|---|
| 8,225,829 B2 * | 7/2012 | Melamed | A45C 1/024 190/103 |
| 2006/0283768 A1 * | 12/2006 | Schriner | A45C 13/02 206/574 |
| 2008/0237077 A1 * | 10/2008 | Sage | B42F 7/08 220/230 |
| 2019/0202621 A1 * | 7/2019 | Rogers | B65D 5/36 |

* cited by examiner

*Primary Examiner* — Shawn M Braden
(74) *Attorney, Agent, or Firm* — Buchanan Ingersoll & Rooney PC

(57) ABSTRACT

A storage system is disclosed. The storage system comprises a lidless container having an upper portion. The storage system also comprises a reusable sleeve having an elastic wall extending from a first end to a second end. The first end defines an opening being moveable between an open state and a closed state. The second end releasably surrounds the upper portion when the sleeve is attached to the container. The storage system includes two or more magnets engageably mounted around the opening of the sleeve. When the two or more magnets are disengaged, the opening is in the open state and when the two or more magnets are engaged, the opening is in the closed state.

24 Claims, 13 Drawing Sheets

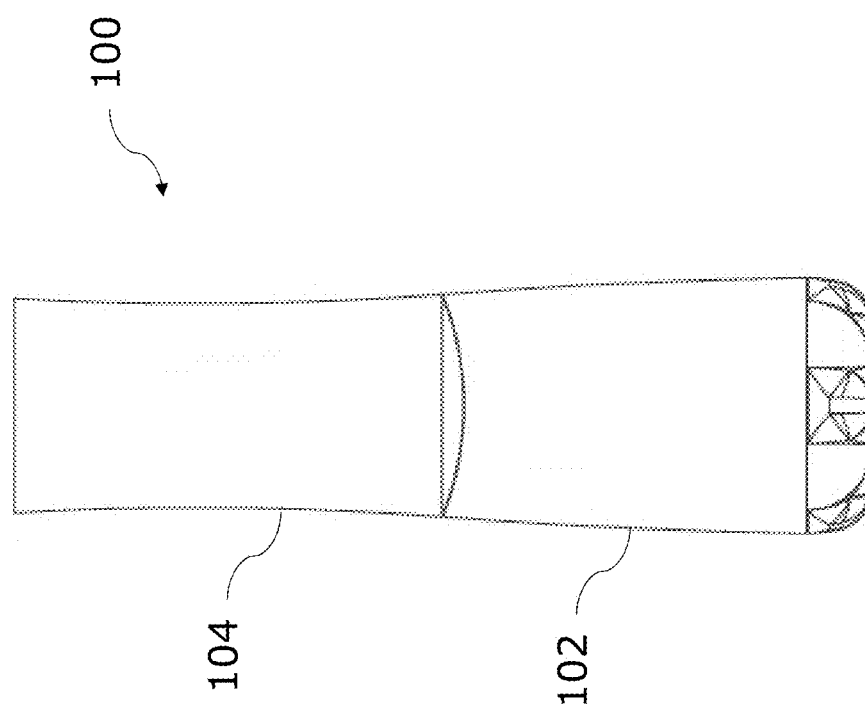

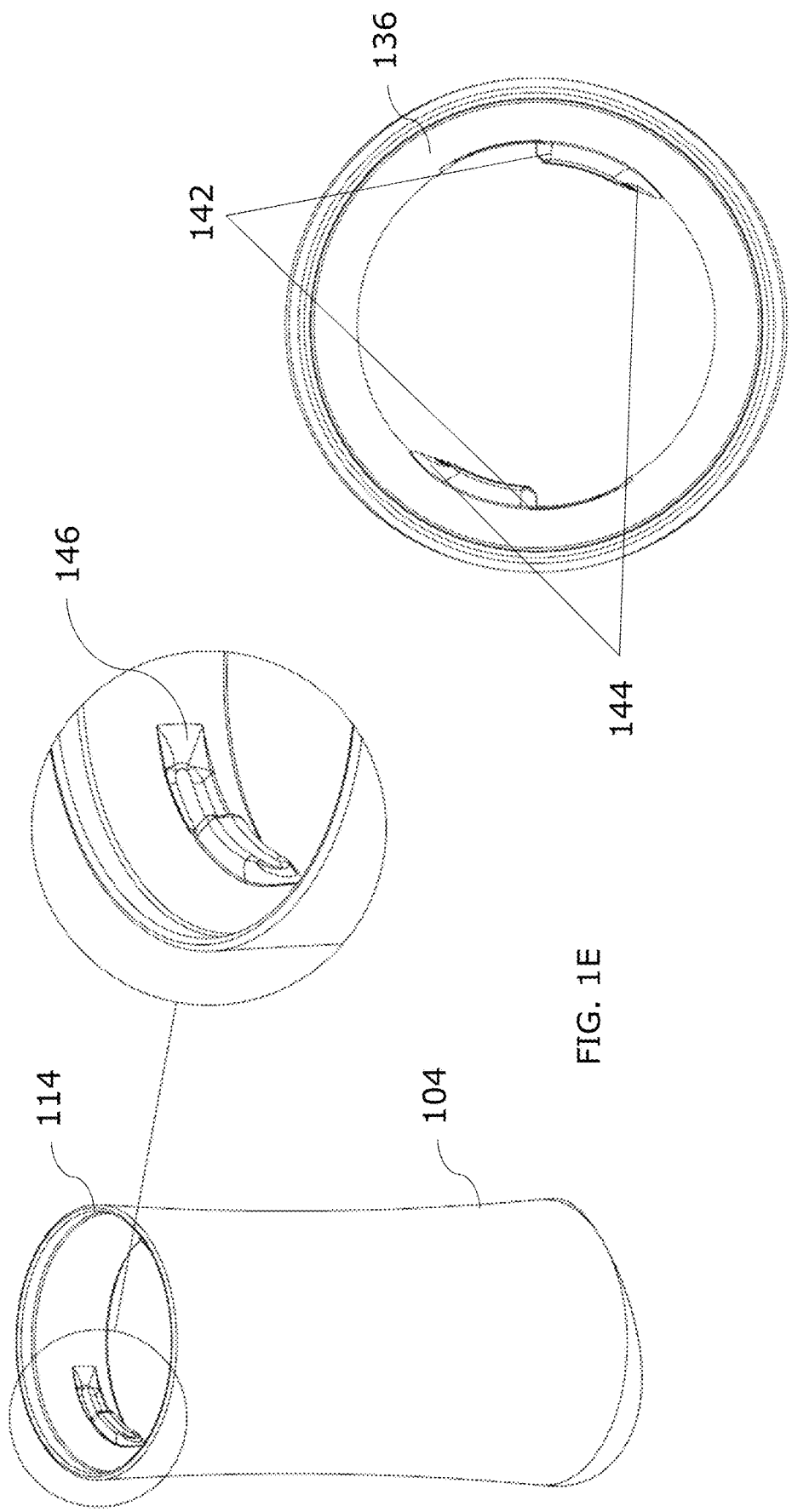

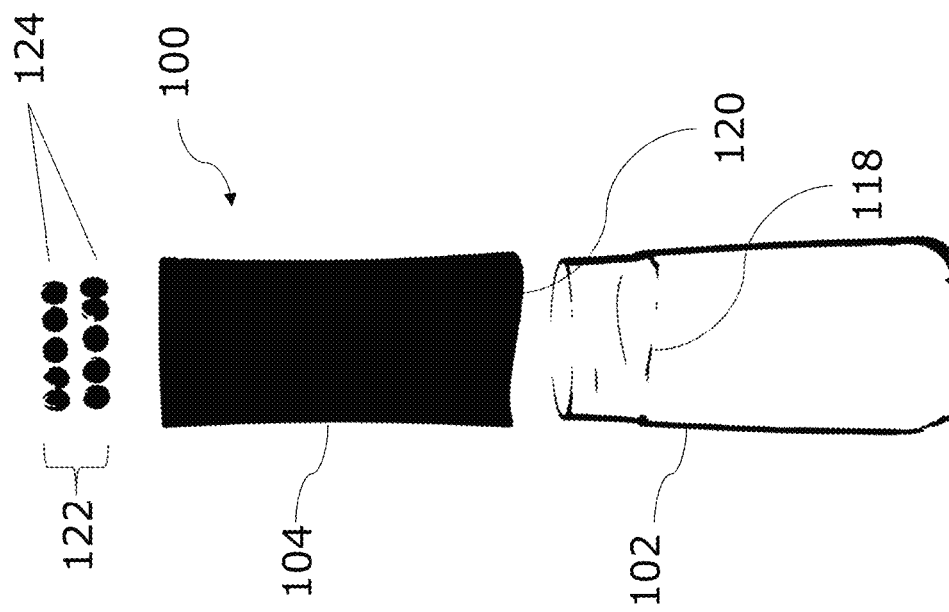

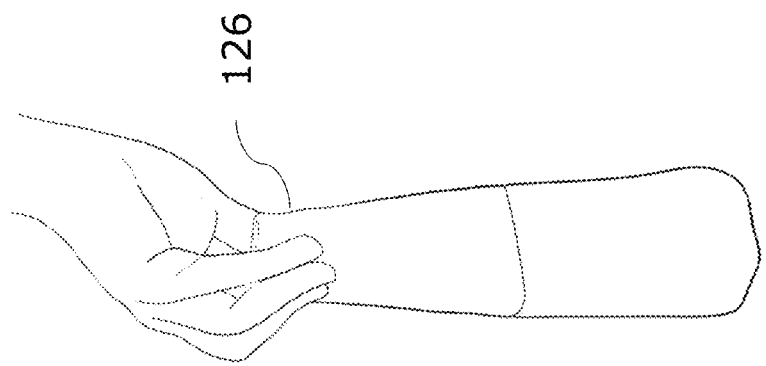
FIG. 2C
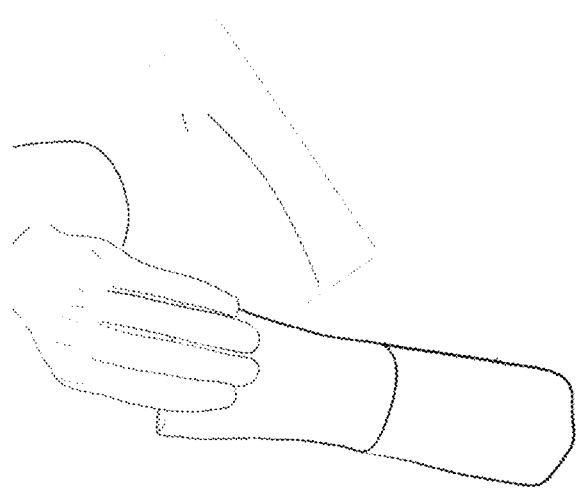
FIG. 2B
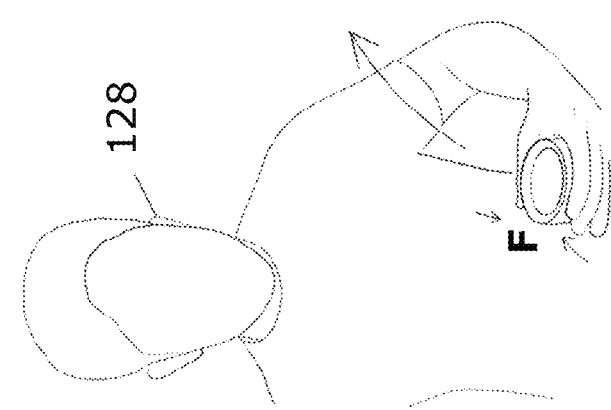

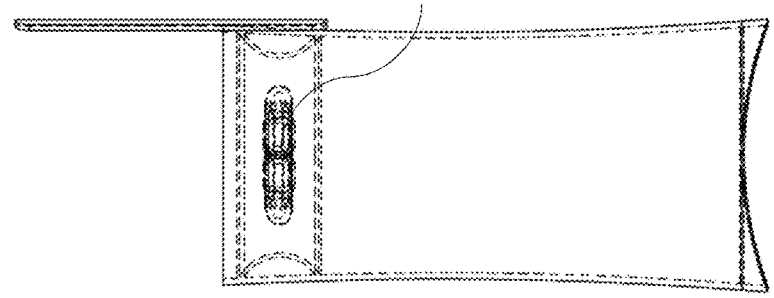
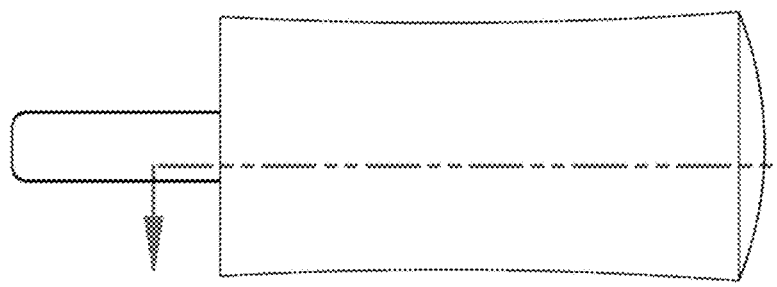
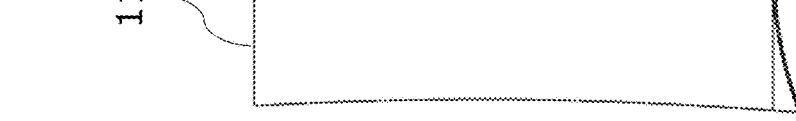
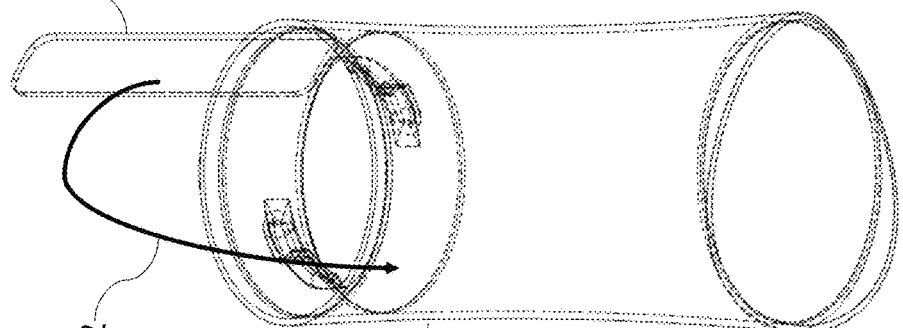

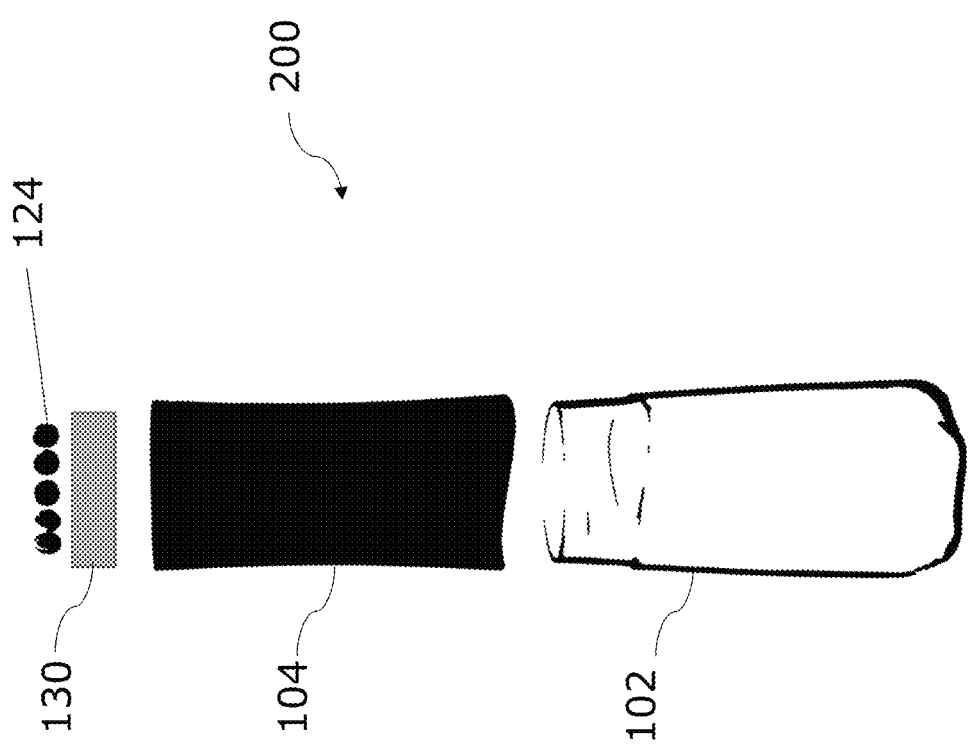

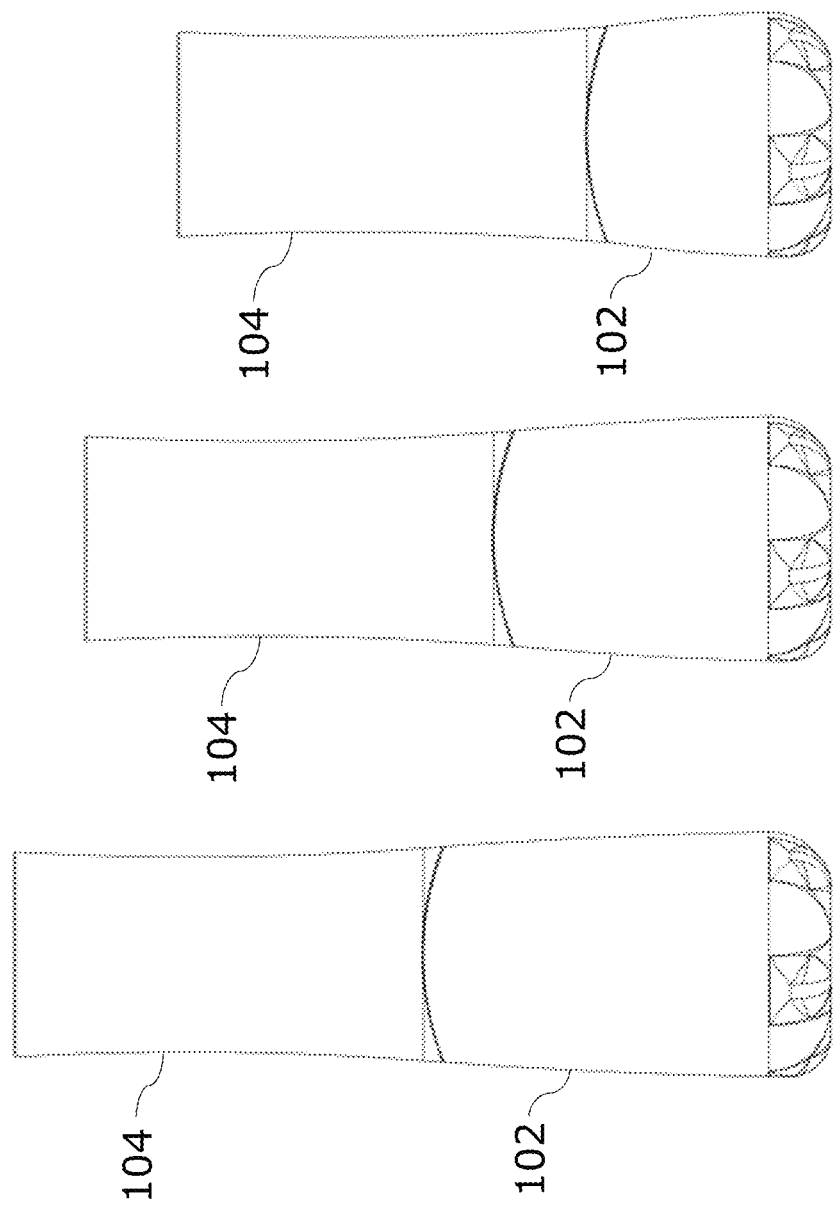

STORAGE SYSTEM WITH MAGNETIC SEALING CLOSURE

CROSS-REFERENCE TO RELATED APPLICATIONS

This application claims priority from U.S. Provisional Patent Application No. 63/237,373, filed Aug. 26, 2021, incorporated herein by reference in its entirety and for all purposes.

TECHNICAL FIELD

The present invention relates generally to storage systems, and more particularly, to storage systems comprising a container with magnetic sealing closure for selectively opening and closing access to an interior of the container.

BACKGROUND

Plastics are commonly used to manufacture a variety of products in a wide range of applications, including consumer products used for single-use, disposable, or short-term storage applications. More specifically, plastics are commonly used to manufacture containers, e.g. water bottles or food storage containers, and closures/covers for such containers, e.g. caps or lids. Even with recycling, there is still accumulation of plastic waste and debris in landfills, oceans, and elsewhere. This non-recycled plastic waste/pollution, can create long-lasting environmental impact and damage.

Thus, there remains a need to provide alternative or improved sustainable storage systems that use less plastic materials and include more reusable components and/or recyclable materials.

SUMMARY

Aspects of the present invention are directed to storage systems, and particularly storage systems comprising a container with a magnetic sealing closure for selectively opening and closing access to an interior of the container.

In one exemplary aspect, there is provided a storage system. The storage system comprises a lidless container having an upper portion. The storage system also includes a reusable sleeve having an elastic wall extending from a first end to a second end. The first end defines an opening being moveable between an open state and a closed state. The second end releasably surrounds the upper portion when the sleeve is attached to the container. The storage system further comprises two or more magnets are engageably mounted around the opening of the sleeve. When the two or more magnets are disengaged, the opening is in the open state and when the two or more magnets are engaged, the opening is in the closed state.

In another exemplary aspect, there is provided a storage system. The storage system comprises a lidless container having an upper portion. The storage system also includes a reusable sleeve having an elastic wall extending from a first end to a second end. The first end defines an opening being moveable between an open state and a closed state. The second end releasably surrounds the upper portion when the sleeve is attached to the container. The storage system further comprises a metal layer and one or more magnets engageably mounted around the opening of the sleeve. When the one or more magnets are disengaged from the metal layer, the opening is in the open state and when the one or more magnets are engaged with the metal layer, the opening is in the closed state.

In another exemplary aspect, there is provided a storage system. The storage system comprises a lidless container having an upper portion. The upper portion comprises an elastic wall extending from a first end to a second end. The first end defines an opening being moveable between an open state and a closed state and the second end releasably surrounds the upper portion. The storage system further comprises two or more magnets engageably mounted around the opening. When the one or more magnets are disengaged, the opening is in the open state and when the one or more magnets are engaged, the opening is in the closed state.

In another exemplary aspect, there is provided an apparatus configured to be attached to a lidless container having an upper portion. The apparatus comprises an elastic wall extending from a first end to a second end. The first end defines an opening being moveable between an open state and a closed state and the second end releasably surrounds the upper portion of the container when the apparatus is attached to the container. Two or more magnets are engageably mounted around the opening. When the two or more magnets are disengaged, the opening is in the open state and when the two or more magnets are engaged, the opening is in the closed state.

In another exemplary aspect, there is provided a container. The container comprises an elastic wall extending from a first end to a closed end. The first end defines an opening being moveable between an open state and a closed state. Two or more magnets are engageably mounted around the opening. When the two or more magnets are disengaged, the opening is in the open state and when the two or more magnets are engaged, the opening is in the closed state.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be omitted. In addition, according to common practice, the various features of the drawings are not drawn to scale unless otherwise indicated, and the dimensions of the various features may be expanded or reduced for clarity. Included in the drawings are the following figures:

FIG. 1A is a front view of an exemplary storage system comprising an exemplary container and an exemplary sleeve.

FIG. 1E is a perspective view of the sleeve of FIG. 1A, showing a detailed view of a portion of the sleeve.

FIG. 1F is a top view of the sleeve of FIG. 1A.

FIG. 2A is an exploded view of an exemplary storage system, comprising two or more magnets.

FIG. 2B-2C show images of FIG. 2A, showing application of force.

FIG. 5A is a perspective view of another exemplary sleeve.

FIG. 5B is a side view of the sleeve of FIG. 5A.

FIG. 5C is a front view of the sleeve of FIG. 5A.

FIG. 5D is a cross-section view of the sleeve of FIG. 5A, taken through line 5D-5D.

FIG. 6 is a front view of another exemplary storage system, comprising one or more magnets and a metal layer.

FIG. 9A-9C show images of exemplary storage systems.

DETAILED DESCRIPTION

The storage systems disclosed herein include magnetic sealing closure for containers. While the disclosed storage systems are described herein with respect to lidless fluid containers, it will be understood that the invention is not so limited. To the contrary, aspects of the present invention are usable in other applications in which a magnetic sealing closure is desired.

As used herein, the term "container" comprises an enclosure or apparatus defining an interior space which can contain a fluid, e.g. water or other drinking liquids, or other consumer items (e.g. foods, solids, objects, etc.). In an exemplary embodiment, a container may be a lidless container.

Figure 1C:
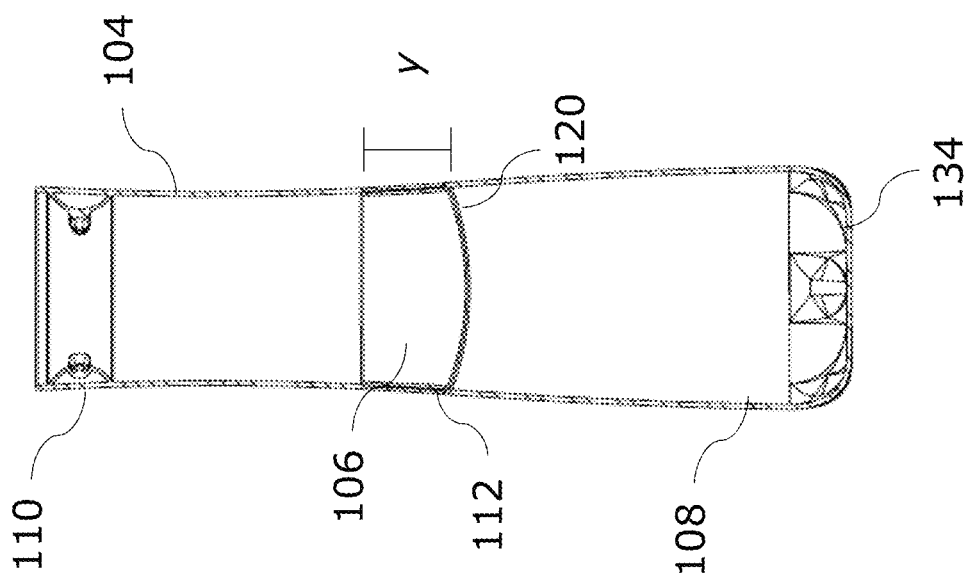
FIG. 1C is a cross-section view of the storage system of FIG. 1B, taken through line 1C-1C.
Figure 1B:
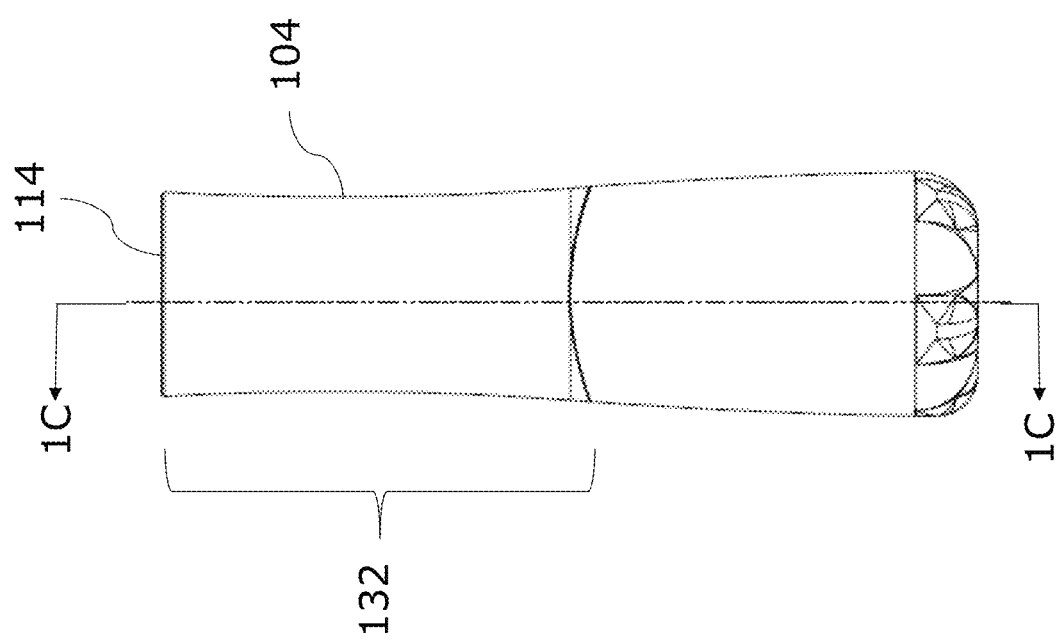
FIG. 1B is a rear view of the storage system of FIG. 1A.
Figure 10:
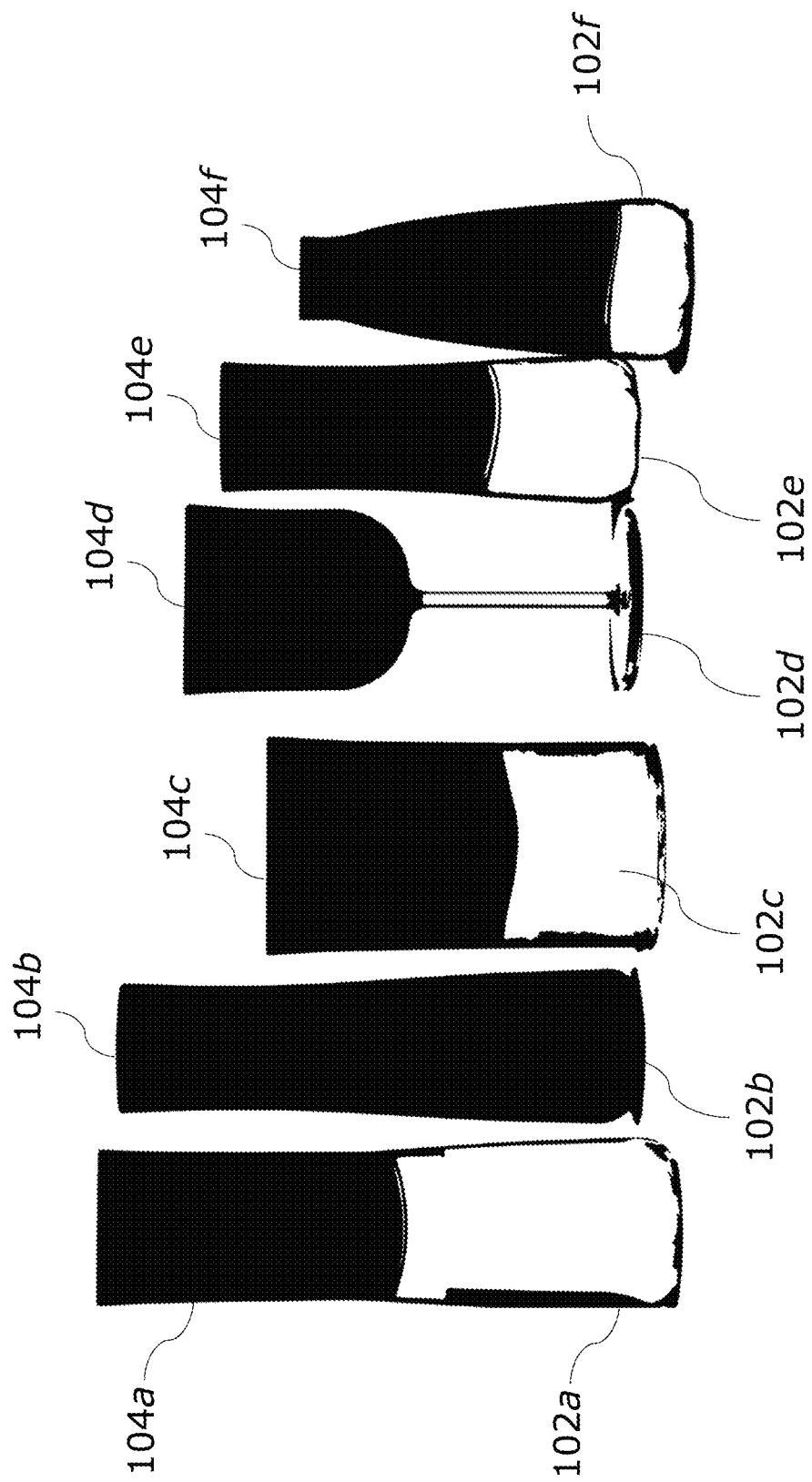
FIG. 10 is an image showing exemplary containers and exemplary sleeves.

With reference to the drawings, FIGS. 1A-1C illustrate an exemplary storage system 100 comprising a container 102 and a sleeve 104. In an exemplary embodiment, sleeve 104 may be sealingly attached to container 102, such that together sleeve 104 and container 102 define a generally tubular body. However, it should be understood that storage system 100 may have other sizes and shapes, depending on the contents to be contained, housed, or secured. More specifically, sleeve 104 may have a different size or shape from that of container 102. Some exemplary embodiments of storage system 100 having sleeve 104 (104a, 104b, 104c, 104d, 104e, 104f) and container 102 (102a, 102b, 102c, 102d, 102e, 102f) are shown in FIG. 10. A person of ordinary skill in the art will understand from the description herein that although FIG. 6 depicts examples of container 102 and sleeve 104, storage system 100 may include other combination of containers 102 and sleeves 104 having different sizes and shapes that form a sealing attachment, such as containers 102 having rounded edges and/or having a size that corresponds to a measured elasticity of elastic wall 132, without departing from the scope of the invention.

In an exemplary embodiment, as shown in FIG. 1C, container 102 may be a lidless container having an upper portion 106 and a base 108. In this embodiment, base 108 provides a stable foundation, such that storage system 100 may stay upright without further assistance or application of external forces. Base 108 may do so based on its physical shape at the bottom portion 134 (e.g. a flat surface) or a weighted bottom portion 134 or a combination of these and other stabilizing features. Upper portion 106 may include an uneven surface. In an exemplary embodiment (shown in FIG. 2A), upper portion 106 may have a ledge structure 118 configured to align and/or hold a second end 112 of sleeve 104 (discussed further below) in a certain vertical position on upper portion 106 of container 102 when sleeve 104 is sealingly attached to container 102, or when second end 112 of sleeve 104 releasably surrounds upper portion 106 of container 102, such that storage system 100 has a smoother exterior surface.

In an exemplary embodiment, as shown in FIGS. 1B-1C, sleeve 104 is configured to be sealingly attached to lidless container 102 having an upper portion 106. Sleeve 104 comprises an elastic wall 132 extending from a first end 110 to second end 112. Generally, sleeve 104 may have a uniform or smooth surface, or may have an uneven surface to include grips, ridges, or raised surfaces to facilitate easier grasp of storage system 100 by a user 128. The uneven surface may extend throughout the entirety of elastic wall 132, or may be present in portions thereof, e.g. first end 110.

As shown in FIGS. 1B and 1C, first end 110 defines an opening 114 being moveable between an open state and a closed state. Second end 112 surrounds upper portion 106 of container 102 and may be permanently or removeably attached to container 102. In an exemplary embodiment, second end 112 may releasably surround upper portion 106 for a height or distance, y, the distance y being sufficient to attach sleeve 104 to container 102, thereby creating a sealing friction fit therebetween. As shown in FIGS. 9A-9C, second end 112 may releasably surround upper portion 106 for a greater or lesser distance than distance, y (FIG. 1C), depending on the shape and size of one or more of sleeve 104 or container 102. Additionally or optionally, second end 112 may releasably surround upper portion 106 at a distance or height, based on user preference, performance, or for ornamental and aesthetic reasons.

In an exemplary embodiment, as shown in FIGS. 1C and 2A, second end 112 may include an edge portion 120 which may be curved. Additionally or optionally, edge portion 120 may be configured to abut ledge structure 118 of container 102. As described above, edge portion 120 may have a curved geometry to correspond to ledge structure 118 of container 102, but edge portion 120 may also be straight and corresponding to ledge structure 118.

When at least one of sleeve 104 and container 102 comprises reusable materials, a more sustainable storage system 100 may be provided because it may be utilized more than one time before disposal or replacement. Sleeve 104 may comprise different materials of construction than container 102. Still further, sleeve 104 may comprise food contact safe or sufficiently inert material and/or material that exhibits little to no corrosion associated with presence of or contact with water within storage system 100. In an exemplary embodiment (as shown in FIG. 2A), sleeve 104 comprises platinum silicone and container 102 comprises biodegradable plastic, glass, or metal material. Further, when at least one of sleeve 104 and container 102 are reusable, cleaning and sanitation of that respective component may be more easily performed.

Opening 114 of sleeve 104 is moveable between an open state and a closed state. At least first end 110 of sleeve 104 comprises material having sufficient rigidity, such that opening 114 has a tendency to be in the open state. In an exemplary embodiment, opening 114 has a tendency to be in the open state, when two or more complimentary magnets 124 (discussed further below) are not engaged, i.e. are not magnetically attracted to each other, in the absence of an application of external force or pressure (F) on at least a portion of an exterior surface of first end 110. Still further, at least first end 110 of sleeve 104 comprises material having sufficient rigidity, such that opening 114 is maintained in the open state, for allowing secure input and output of contents to and from storage system 100.

Referring now to FIGS. 1C, 1D-1F, and 2A-2C, storage system 100 may comprise a magnetic sealing closure. In an exemplary embodiment, magnetic sealing closure 122 may include two or more complimentary magnets 124 positioned opposite of each other and configured to be engageably mounted along a circumference, or portion thereof, of opening 114 of sleeve 104. In another exemplary embodiment, two or more complimentary magnets 124 may be mounted in an interior surface of elastic wall 132 of sleeve 104 and/or may have a surface coating comprising food contact safe or sufficiently inert material. In an additional exemplary embodiment, complimentary magnets 124 may be embedded within elastic wall 132.

Two or more complimentary magnets 124 may be mounted on one or more flexible strips. One or more flexible strips having complimentary magnets 124 may be mounted on or around opening 114 of sleeve 104. In an exemplary embodiment, one or more flexible strips having complimentary magnets 124 may be fixedly coupled to an interior surface of elastic wall 132 of sleeve 104 via attachment means, such as adhesives. In an additional exemplary embodiment, one or more flexible strips having complimentary magnets 124 may be embedded within elastic wall 132. In another exemplary embodiment, one or more flexible strips may be fixedly coupled along a circumference, or a portion thereof, of opening 114 of first end 110.

Although FIG. 2A references a row of five magnets 124 and another row of five complimentary magnets 124, one of ordinary skill in the art would understand from the description herein that the invention is not so limited to this particular number or arrangement of complimentary magnets 124. Further, two or more complimentary magnets 124 may comprise neodymium magnets.

In operation, as shown in FIGS. 2A-2C, an application of external force or pressure (F) on first end 110 of sleeve 104 pushes complimentary magnets 124 towards each other so that they engage with each other. Specifically, an application of external force or pressure (F) on at least a portion of an exterior surface of first end 110 moves two or more complimentary magnets 124 towards each other so that the magnetic attraction between complimentary magnets 124 occurs. When two or more complimentary magnets 124 are thus engaged, e.g. by magnetic attraction to each other, interior surfaces of opening 114 of sleeve 104 are moved toward a sealing contact with each other.

Figure 1D:
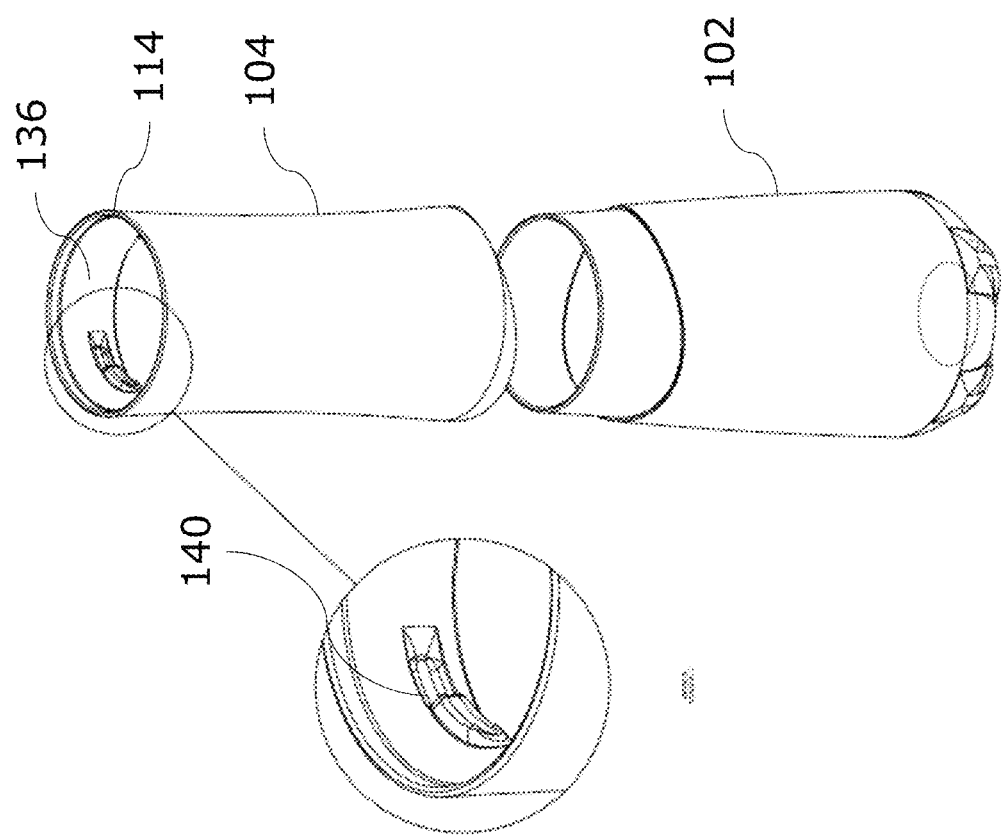
FIG. 1D is a partially exploded view of the storage system of FIG. 1A, showing a detailed view of a portion of the storage system.

In an exemplary embodiment, as shown in FIGS. 1D-1F, the sealing contact may be facilitated by first end 110 having a sealing surface 136 that moves the opening 114 into the closed state. Specifically, sealing surface 136 may comprise at least a pair of sealing members 140 that may be mounted on or embedded within the interior surface of sleeve 104. Sealing members 140 may include a protrusion 142 and an angled surface 144. Sealing members 140 may be disposed along a circumference of sealing surface 136 and may be positioned relative to each other such that protrusions 142 and corresponding angled surfaces 144 are disposed opposite each other. Further, angled surface 144 defines an opening 146, such as a void or a pocket, and may have a generally sloped geometry that is configured to receive a corresponding protrusion 142, thereby providing a sealing contact for the interior surface of sleeve 104.

In operation, as shown in FIGS. 2A-2C, when sleeve 104 includes two or more complimentary magnets 124 and when magnets 124 are engaged, sealing members 140 become engaged, such that protrusion 142 is received by corresponding angled surface 144 that is disposed opposite of protrusion 142. This forms a fluid tight seal and moves opening 114 toward the closed state. When opening 114 is in the closed state, access to the interior space or leakage of contents from the interior space of storage system 100 is prevented.

Figure 3C:
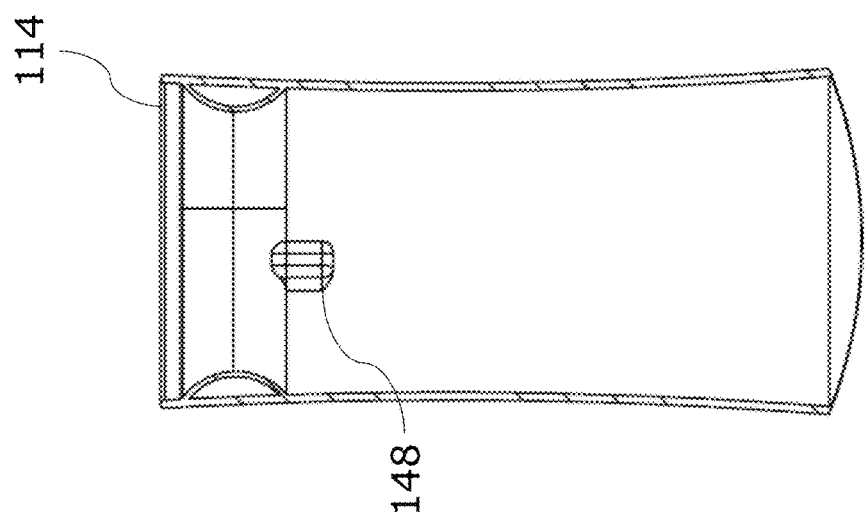
FIG. 3C is a cross-section view of the sleeve of FIG. 3A, taken through line 3C-3C.
Figure 3B:
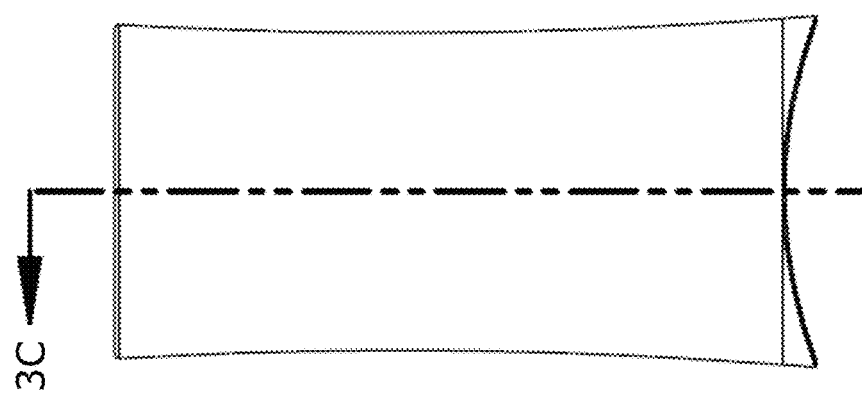
FIG. 3B is a side view of the sleeve of FIG. 3A.
Figure 3A:
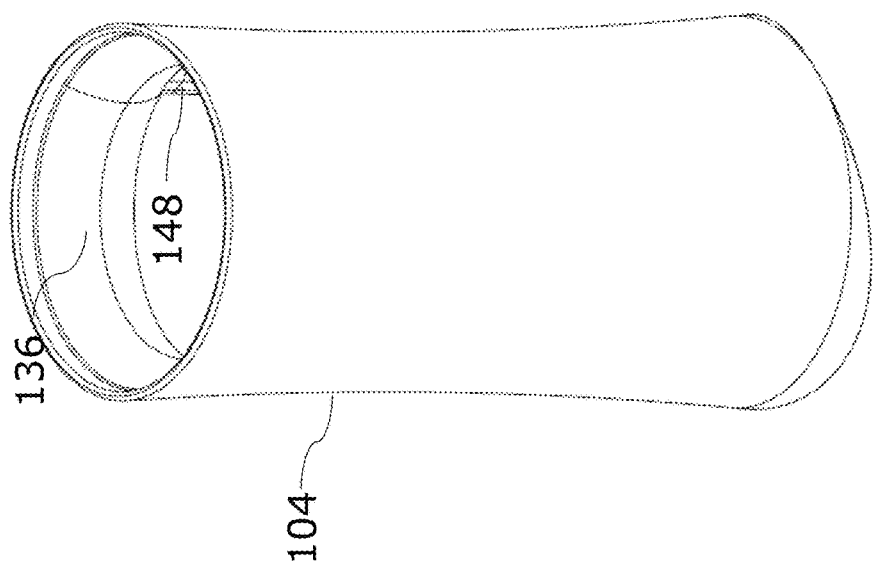
FIG. 3A is a perspective view of another exemplary sleeve.
Figure 4D:
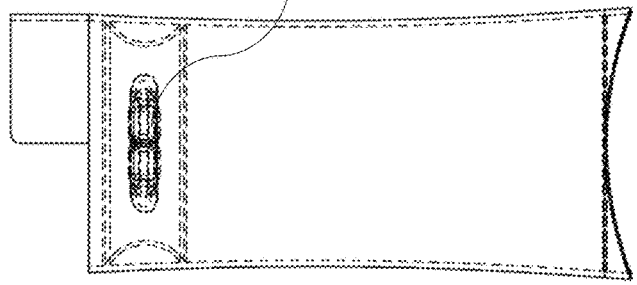
FIG. 4D is a cross-section view of the sleeve of FIG. 4A, taken through line 4D-4D.
Figure 4C:
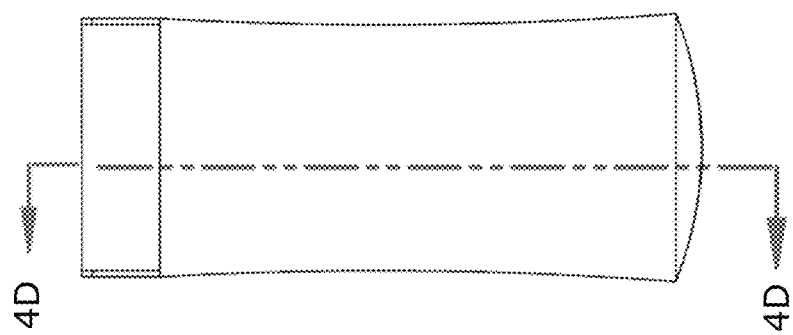
FIG. 4C is a front view of the sleeve of FIG. 4A.
Figure 4B:
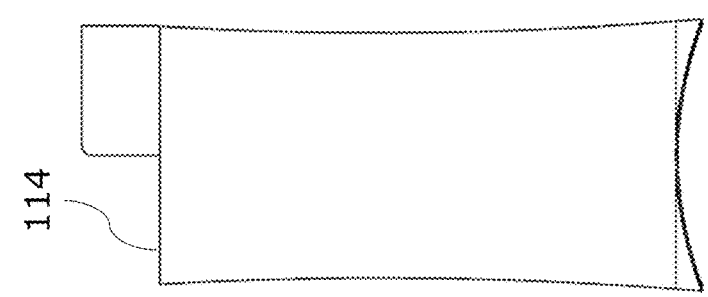
FIG. 4B is a side view of the sleeve of FIG. 4A.
Figure 4A:
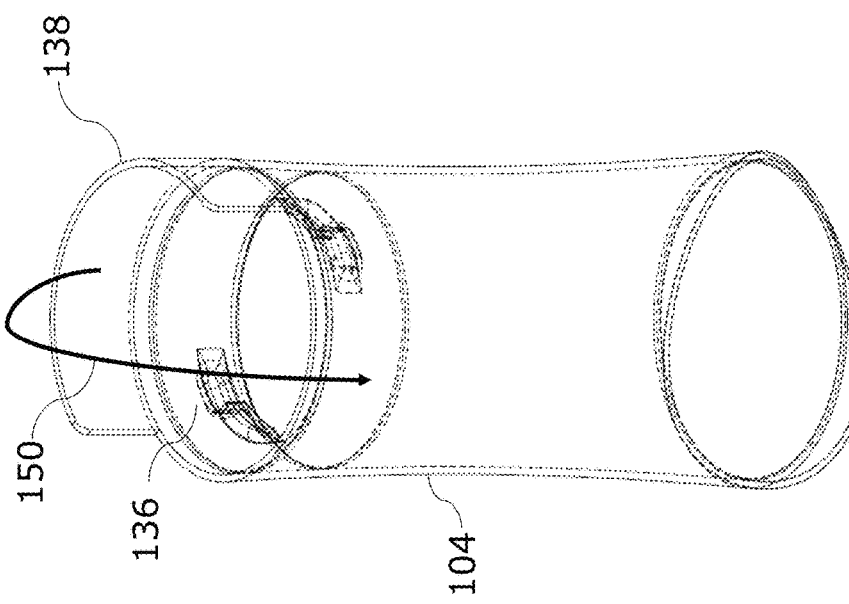
FIG. 4A is a perspective view of another exemplary sleeve.

In still another exemplary embodiment, as shown in FIGS. 3A-3C, the sealing contact may be facilitated by first end 110 having sealing surface 136 that moves the opening 114 into the closed state. Specifically, sealing surface 136 may comprise a tab 148, that may be mounted on or embedded within the interior surface of sleeve 104. Tab 148 may be disposed along a portion of the circumference of sealing surface 136 and may be positioned relative to a corresponding gap, void, or pocket defined by the interior surface of sleeve 104, such that tab 148 and corresponding gap, void or pocket are disposed opposite each other. Further, tab 148 may be received by corresponding gap, void or pocket, thereby providing a sealing contact for the interior surface of sleeve 104.

In operation, as shown in FIGS. 2A-2C, when sleeve 104 includes two or more complimentary magnets 124 and magnets 124 are engaged, tab 148 and corresponding gap, void or pocket are engaged to form a fluid tight seal, thereby moving opening 114 toward the closed state. When opening 114 is in the closed state, access to the interior space or leakage of contents from the interior space of storage system 100 is prevented.

In another exemplary embodiment, as shown in FIGS. 4A-4D, the sealing contact may be facilitated by first end 110 having sealing surface 136 that moves the opening 114 into the closed state. A portion of sealing surface 136 may extend vertically above opening 114, creating a flap 138 that may be configured to collapse over a portion of the exterior surface of sleeve 104 along a direction 150, thereby providing a clamping closure mechanism and a sealing contact for the interior surfaces of opening 114. Flap 138 may extend for a width equivalent to at least half of the circumference of opening 114 and may extend for a length, such that flap 138 covers a sufficient portion of the exterior surface of sleeve 104 to move opening 114 into the closed state. Although FIGS. 3A-3D illustrate that sleeve 104 and flap 138 are integrally formed of unitary construction, one of ordinary skill in the art would understand from the description herein that flap 138 and sleeve 104 may be separate components configured to be attached by known attachment means, such as adhesives. Further, flap 138 may comprise the same inert material as sleeve 104, or may comprise different materials, including flexible materials, such as polyethylene, terephthalate, polycarbonate, or a BPA-free or low-BPA plastic material.

When sealing surface 136 comprises at least the pair of sealing members 140, flap 138 may be positioned or configured to extend at a location above one of the pair of sealing members 140. In operation, when two or more complimentary magnets 124 are engaged, the pair of sealing members 140 become engaged, such that opening 114 is in the closed state. An application of external force or pressure (F) on flap 138 moves flap 138 to collapse over the portion of the exterior surface of sleeve 104, thereby providing a fluid tight seal. When opening 114 is in the closed state, access to the interior space or leakage of contents from the interior space of storage system 100 is prevented. Additionally or optionally, flap 138 may be moveable over the portion of the exterior surface of sleeve 104, such that a seamless fit between the flap 138 and the sleeve 104 is achieved.

Additionally or optionally, an end portion of flap 138 may include magnet 124 that corresponds to complimentary magnet 124 mounted on or embedded within elastic wall 132 of sleeve 104. An application of external force or pressure (F) on flap 138 moves flap 138 to collapse over the portion of the exterior surface of sleeve 104, such that magnet 124 of flap 138 and complimentary magnet 124 of sleeve 104 move towards each other so that the magnetic attraction between complimentary magnets 124 occurs. When two or more complimentary magnets 124 are thus engaged, e.g. by magnetic attraction to each other, interior surfaces of opening 114 of sleeve 104 are moved toward sealing contact with each other.

In yet another embodiment, as shown in FIGS. 5A-5D, the sealing contact may be facilitated by first end 110 having sealing surface 136 that moves the opening 114 into the closed state. A portion of sealing surface 136 may extend vertically above opening 114, such that a latch 158 may be configured to collapse over a portion of the exterior surface of sleeve 104 along a direction 152, thereby providing a clamping closure mechanism and a sealing contact for the interior surfaces of opening 114. Latch 158 may extend for a width less than the circumference of opening 114 and may extend for a length, such that latch 158 covers a sufficient portion of exterior surface of sleeve 104 to move opening 114 into the closed state. Although FIGS. 4A-4D illustrate that sleeve 104 and latch 158 are integrally formed of unitary construction, one of ordinary skill in the art would understand from the description herein that latch 158 and sleeve 104 may be separate components configured to be attached by known attachment means, such as adhesives. Further, latch 158 may comprise the same inert material as sleeve 104, or may comprise different materials, such as including flexible materials, such as polyethylene, terephthalate, polycarbonate, or a BPA-free or low-BPA plastic material.

When sealing surface 136 comprises at least the pair of sealing members 140, latch 158 may be positioned or configured to extend at a location above one of the pair of sealing members 140. In operation, when two or more complimentary magnets 124 are engaged, the pair of sealing members 140 become engaged, such that opening 114 is in the closed state. An application of external force or pressure (F) on latch 158 moves latch 158 to collapse over the portion of the exterior surface of sleeve 104, thereby providing a fluid tight seal. When opening 114 is in the closed state, access to the interior space or leakage of contents from the interior space of storage system 100 is prevented.

Additionally or optionally, an end portion of latch 158 may include magnet 124 that corresponds to complimentary magnet 124 mounted on or embedded within elastic wall 132 of sleeve 104. An application of external force or pressure (F) on latch 158 may move magnet 124 of latch 158 and complimentary magnet 124 of sleeve 104 towards each other so that the magnetic attraction between complimentary magnets 124 occurs. When two or more complimentary magnets 124 are thus engaged, e.g. by magnetic attraction to each other, interior surfaces of opening 114 of sleeve 104 are moved toward sealing contact with each other.

As shown in FIG. 2C, when two or more complimentary magnets 124 are engaged and opening 114 is in the closed state, first end 110 of sleeve 104 may define a pinched or tapered area 126. Pinched area 126 may be ergonomically shaped and sized to permit easier grasp and control of storage system 100. Still further, pinched area 126 may permit more ease of portability, as shown in FIG. 2C. Pinched area 126 may also permit storage system 100 to be more user friendly across multiple age groups and for users who may have limited mobility or physical disabilities.

The application of external force of pressure (F) may also bring two or more complimentary magnets 124 to engage with another of two or more complimentary magnets 124 for providing a partial seal closure of storage system 10, such that contents within storage system 100 may be selectively prevented from leaking out to an external environment. Thus, partial seal closure may allow for a smaller opening 114 than when opening 114 is in the open state. In such an embodiment, pouring or release of the contents of storage system 100 may be more easily controlled by user 128.

Conversely, when two or more complimentary magnets 124 are disengaged, opening 114 is in the open state. When external force or pressure (F) is applied on at least a portion of an exterior surface of sleeve 104, the magnetic attraction between two or more complimentary magnets 124 is overcome because application of external force or pressure (F) separate two or more complimentary magnets 124 from each other, such that they become disengaged and interior surfaces of elastic wall 132 are not in sealing contact.

In an exemplary embodiment, when two or more complimentary magnets 124 are disengaged, protrusion 142 can be disengaged from a corresponding angled surface 144, such that opening 114 is in the open state. Additionally or optionally, at least the end portion of flap 138 or latch 158 may be separated from the exterior surface of sleeve 104 via an application of force or pressure (F), such that opening 114 is in the open state. In still another exemplary embodiment, when two or more complimentary magnets 124 are disengaged, tab 148 can be disengaged from corresponding gap, void or pocket, such that opening 114 is in the open state. When opening 114 is in the open state, access to the contents within storage system 100 may be permitted. In an exemplary embodiment, user 128 may drink from storage system 100 when opening 114 is in the open state.

In FIG. 6, another exemplary embodiment of storage system 100 is illustrated. The components of this embodiment, such as storage system 200, generally correspond to those of the first embodiment, such as storage system 100. In this embodiment, storage system 200 comprises magnetic sealing closure 122 including a metal layer 130 that can be magnetically attracted and one or more magnets 124. Metal layer 130 and one or more magnets 124 may be engageably mounted on or around opening 114 of sleeve 104. In particular, one or more magnets 124 may be mounted in an interior surface of elastic wall 132 of sleeve 104. Metal layer 130 may be similarly mounted as one or more magnets 124 on or around a portion of opening 114. Metal layer 130 and one or more magnets 124 may each be mounted on or around opening 114 via attachment means, such as adhesives.

When one or more magnets 124 are disengaged from metal layer 130, opening 114 is in the open state. When external force or pressure (F) is applied on at least a portion of an exterior surface of sleeve 104, one or more magnets 124 become disengaged from metal layer 130, thereby moving opening 114 to the open state.

When one or more magnets 124 are engaged with metal layer 130, opening 114 is in the closed state. An application of external force or pressure (F) on first end 110 of sleeve 104 engages one or more magnets 124 to metal layer 130. Specifically, an application of external force or pressure (F) on at least a portion of an exterior surface of first end 110 engages one or more magnets 124 to metal layer 130.

Figure 7:
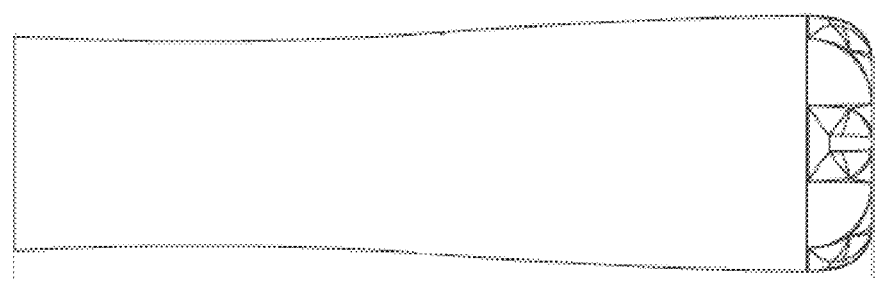
FIG. 7 is a front view of another exemplary storage system.

Turning now to FIG. 7, another embodiment of the storage system 100 made according to the present invention is illustrated. The components of this embodiment, such as storage system 300, generally correspond to those of the first embodiment, i.e. storage system 100. In this embodiment, container 102 and sleeve 104 are of unitary construction. More particularly, storage system 400 comprises container 102, such as a lidless container having upper portion 106. Sleeve 104 may comprise elastic wall 132 extending from first end 110 to second end 112. First end 110 defines opening 114 being moveable between an open state and a closed state. Second end 112 releasably surrounds upper portion 106 when sleeve 104 is sealingly attached to container 102. Two or more complimentary magnets 124 may be engageably mounted around opening 114. When two or more complimentary magnets 124 are disengaged, opening 114 is in the open state and when two or more magnets 124 are engaged, opening 114 is in the closed state.

Figure 8:
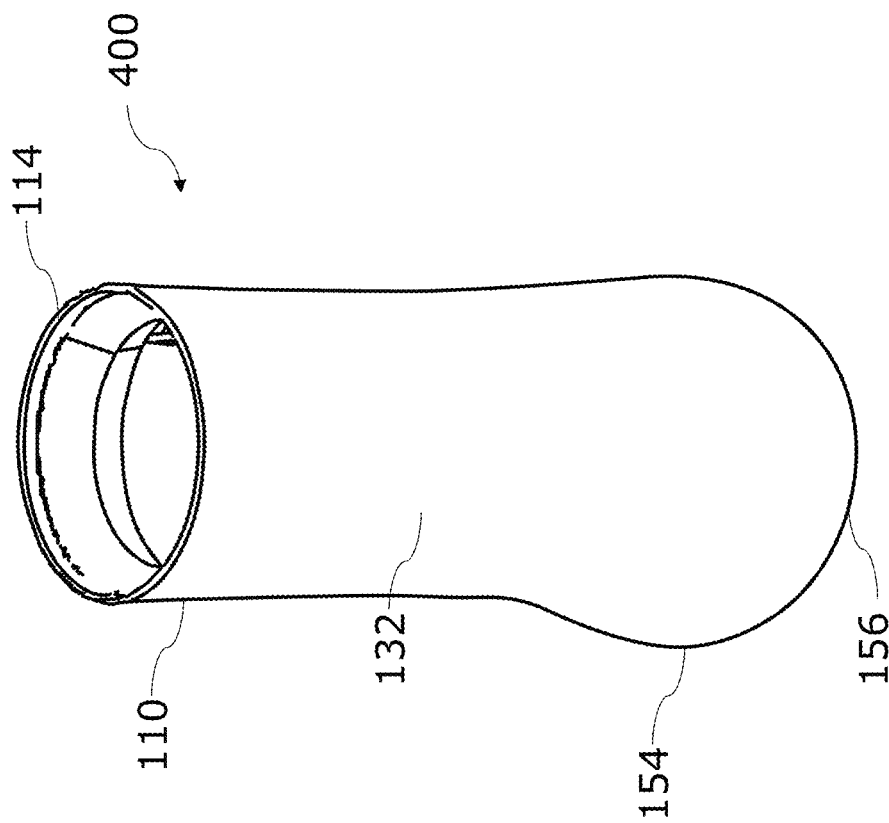
FIG. 8 is a perspective view of another exemplary storage system.

Turning now to FIG. 8, another embodiment of the storage system 100 made according to the present invention is illustrated. The components of this embodiment, such as storage system 400, generally correspond to those of the first embodiment, i.e. storage system 100, except that this embodiment does not incorporate a separate container 102. In this embodiment, storage system 400 comprises elastic wall 132 extending from first end 110 to a closed end 154. First end 110 defines opening 114 being moveable between an open state and a closed state. In an exemplary embodiment, closed end 154 has sufficient rigidity to provide a stable foundation, such that storage system 400 may stay upright without further assistance or application of external forces. Closed end 154 may do so based on its physical shape (e.g. a flat surface) or a weighted bottom portion 156 or a combination of these and other stabilizing features. Two or more complimentary magnets 124 may be engageably mounted around opening 114. When two or more complimentary magnets 124 are disengaged, opening 114 is in the open state and when two or more complimentary magnets 124 are engaged, opening 114 is in the closed state.

Although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. A storage system comprising:
a lidless container having an upper portion;
a reusable sleeve having an elastic wall extending from a first end to a second end, the first end defining an opening being moveable between an open state and a closed state, the second end is configured to releasably surround the upper portion when the sleeve is attached to the container;
two or more magnets engageably mounted around the opening of the sleeve;
wherein when the two or more magnets are disengaged, the opening is in the open state and when the two or more magnets are engaged, the opening is in the closed state; and
wherein the first end comprises a sealing surface including two or more sealing members engageably mounted around the opening of the sleeve, at least one of the two or more sealing members comprising an angled surface having an opening configured to receive at least a portion of a corresponding protrusion of the other of the two or more sealing members, when the two or more magnets are engaged.

2. The storage system of claim 1, wherein the two or more magnets are mounted on one or more flexible strips.

3. The storage system of claim 2, wherein the one or more flexible strips is configured to be fixedly coupled to an interior surface of the elastic wall.

4. The storage system of claim 3, wherein the at least one flexible strip is configured to be disposed along a circumference of the opening.

5. The storage system of claim 1, wherein the application of external force or pressure brings the two or more magnets to engage with another of the two or more magnets, thereby providing a complete seal closure.

6. The storage system of claim 1, further comprising a flap extending from the opening, the flap configured to clamp over an exterior surface of the sleeve when the two or more magnets are engaged.

7. The storage system of claim 1, further comprising a latch extending from the opening, the latch configured to clamp over an exterior surface of the sleeve when the two or more magnets are engaged.

8. The storage system of claim 5, further comprising a sealing surfacing having a tab mounted on an interior surface of the elastic wall, the tab being configured to engage a corresponding void defined on the interior surface when the two or more magnets are engaged.

9. The storage system of claim 1, wherein the application of external force or pressure brings the two or more magnets to engage with another of the two or more magnets, thereby providing a partial seal closure.

10. The storage system of claim 1, wherein when the two or more magnets are engaged and the opening is in the closed state, the first end of the sleeve defines a pinched area.

11. The storage system of claim 1, wherein when external force or pressure is applied on at least a portion of an exterior surface of the sleeve, the two or more magnets become disengaged.

12. The storage system of claim 1, wherein the container comprises different materials of construction than the sleeve.

13. The storage system of claim 1, wherein the container comprises biodegradable plastic, glass, or metal material.

14. The storage system of claim 1, wherein the sleeve comprises food contact safe material.

15. The storage system of claim 14, wherein the sleeve comprises platinum silicone.

16. The storage system of claim 1, wherein the upper portion has an uneven surface, such that when the second end releasably surrounds the upper portion, the storage system has a smooth exterior surface.

17. The storage system of claim 16, wherein the sleeve and the container together define a generally tubular body when the sleeve is attached to the container, thereby permitting ease of grasp and control of the storage system.

18. The storage system of claim 1, wherein the two or more magnets comprise neodymium magnets.

19. The storage system of claim 1, wherein the container is a fluid container.

20. A storage system comprising:
a lidless container having an upper portion;
a reusable sleeve having an elastic wall extending from a first end to a second end, the first end defining an opening being moveable between an open state and a closed state, the second end releasably surrounding the upper portion when the sleeve is attached to the container;
a metal layer and one or more magnets engageably mounted around the opening of the sleeve; and
wherein when the one or more magnets are disengaged from the metal layer, the opening is in the open state and when the one or more magnets are engaged with the metal layer, the opening is in the closed state.

21. A storage system comprising:
a lidless container having an upper portion, the upper portion comprising an elastic wall extending from a first end to a second end, the first end defining an opening being moveable between an open state and a closed state, the second end configured to releasably surround the upper portion;
two or more magnets engageably mounted around the opening; and
wherein when the one or more magnets are disengaged, the opening is in the open state and when the one or more magnets are engaged, the opening is in the closed state; and
wherein the first end comprises a sealing surface including two or more sealing members engageably mounted around the opening of the elastic wall, at least one of the two or more sealing members comprising an angled surface having an opening configured to receive at least a portion of a corresponding protrusion of the other of the two or more sealing members, when the one or more magnets are engaged.

22. An apparatus configured to be attached to a lidless container having an upper portion, the apparatus comprising:
an elastic wall extending from a first end to a second end, the first end defining an opening being moveable between an open state and a closed state and the second end configured to releasably surround the upper portion of the container when the apparatus is attached to the container;
two or more magnets engageably mounted around the opening;
wherein when the two or more magnets are disengaged, the opening is in the open state and when the two or more magnets are engaged, the opening is in the closed state; and
wherein the first end comprises a sealing surface including two or more sealing members engageably mounted around the opening of the elastic wall, at least one of the two or more sealing members comprising an angled surface having an opening configured to receive at least a portion of a corresponding protrusion of the other of the two or more sealing members, when the two or more magnets are engaged.

23. A container comprising:
an elastic wall extending from a first end to a closed end, the first end defining an opening being moveable between an open state and a closed state;
two or more magnets engageably mounted around the opening;
wherein when the two or more magnets are disengaged, the opening is in the open state and when the two or more magnets are engaged, the opening is in the closed state; and
wherein the first end comprises a sealing surface including two or more sealing members engageably mounted around the opening of the elastic wall, at least one of the two or more sealing members comprising an angled surface having an opening configured to receive at least a portion of a corresponding protrusion of the other of the two or more sealing members, when the two or more magnets are engaged.

24. The storage system of claim 1, wherein at least the second end of the sleeve is configured to be separated from the lidless container when the sleeve is not attached to the container.

* * * * *